US 6,670,070 B2

(12) United States Patent
Yoshioka et al.

(10) Patent No.: US 6,670,070 B2
(45) Date of Patent: Dec. 30, 2003

(54) BATTERY AND PROCESS FOR PREPARING THE SAME

(75) Inventors: Shoji Yoshioka, Tokyo (JP); Makiko Kise, Tokyo (JP); Hiroaki Urushibata, Tokyo (JP); Hisashi Shiota, Tokyo (JP); Jun Aragane, Tokyo (JP); Shigeru Aihara, Tokyo (JP); Daigo Takemura, Tokyo (JP); Takashi Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 123 days.

(21) Appl. No.: 09/742,074

(22) Filed: Dec. 22, 2000

(65) Prior Publication Data

US 2001/0005558 A1 Jun. 28, 2001

Related U.S. Application Data

(63) Continuation of application No. PCT/JP98/02859, filed on Jun. 25, 1998.

(51) Int. Cl.$^7$ ............................ H01M 10/50; H01M 4/60
(52) U.S. Cl. ................... 429/62; 429/212; 429/300; 429/303
(58) Field of Search .............. 429/62, 217, 212, 429/232, 185, 300, 304, 303; 252/182.1

(56) References Cited

U.S. PATENT DOCUMENTS

| 3,901,960 A | * | 8/1975 | Holloway et al. | ............ 264/104 |
| 5,759,714 A | * | 6/1998 | Matsufuji et al. | ............ 429/194 |
| 6,306,540 B1 | | 10/2001 | Hiroi et al. | |
| 6,399,252 B1 | | 6/2002 | Kise et al. | |

FOREIGN PATENT DOCUMENTS

| JP | 61-074257 | 4/1986 |
| JP | 1-197963 | 8/1989 |
| JP | 4-058455 | 2/1992 |
| JP | 5-074493 | 3/1993 |
| JP | 6-231749 | 8/1994 |
| JP | 8-306354 | 11/1996 |
| JP | 9-213305 | 8/1997 |
| JP | 9-259923 | 10/1997 |
| JP | 10-106516 | 4/1998 |
| JP | 10-241665 | 9/1998 |

* cited by examiner

*Primary Examiner*—Stephen Kalafut
*Assistant Examiner*—R Alejandro
(74) *Attorney, Agent, or Firm*—Oblon, Spivak, McClelland, Maier & Neustadt, P.C.

(57) ABSTRACT

A conventional battery has a problem that a large short-circuit current was generated with temperature rise due to internal short-circuit or the like, and therefore, the temperature of the battery further increases due to exothermic reaction to increase the short-circuit current. The present invention has been carried out in order to solve the above problems. The battery of the present invention is a battery wherein at least one of a positive electrode 1 and a negative electrode 2 comprises an active material layer 6 containing an active material 8 and an electronically conductive material 9 contacted to the active material 8, wherein a solid electrolytic layer 3 is interposed between the above positive electrode 1 and the negative electrode 2, and wherein the above electronically conductive material 9 comprises an electrically conductive filler and a resin so that resistance increases with temperature rise.

8 Claims, 6 Drawing Sheets

BATTERY AND PROCESS FOR PREPARING THE SAME

CROSS-REFERENCE TO RELATED APPLICATIONS

The present application is a continuation application of International Application Number PCT/JP98/02859, filed Jun. 25, 1998, and claims priority to International Application Number PCT/JP98/02859.

TECHNICAL FIELD

The present invention relates to a battery and a process for preparing the same. More particularly, the present invention relates to a battery in which safety is ensured by controlling temperature rise caused by short-circuit or the like, and a process for preparing the same.

BACKGROUND ART

Recently, with development in electronic appliances, high leveling of capacity and output density of a battery used as a power source is being advanced. As a battery, which can satisfy these requirements, attention is paid to a lithium ion secondary battery. The lithium ion secondary battery has an advantageous effect that energy density is high, while a sufficient counterplan for safety is required because a non-aqueous electrolytic solution is used.

As a counterplan for safety it has been conventionally suggested to incorporate a safety valve which releases increased internal pressure, or a PTC device of which resistance increases in accordance with the heat generated from external short circuit to break an electric current.

For example, as disclosed in Japanese Unexamined Patent Publication No. 328278/1992, there is known a method for attaching a safety valve and a PTC device to the positive electrode cap of a cylindrical battery. However, when the safety valve is operated, water in air may invade into the battery to react with lithium in the negative electrode and there is a fear of an exothermic reaction.

On the other hand, the PTC device successively breaks external short-circuit without causing any troubles. As a safety component running firstly at the emergency of the battery, the PTC device can be designed to run when the battery reaches at least 90° C. due to external short circuit.

Since the conventional lithium secondary battery has the structure mentioned above, there exist the following problems.

At occurrence of short-circuit and temperature rise inside the lithium secondary battery, increase of the short-circuit current can not be controlled in a conventional lithium secondary battery.

When the short-circuit inside the lithium secondary battery increases a temperature, a polyethylene or polypropylene separator interposed between the positive electrode and the negative electrode is expected to have a function that the separator softens or melts to close holes thereon and release or seal a non-aqueous electrolyte contained in the separator to decrease its ion conductivity, and thereby reducing the short-circuit current.

But in case of using a solid electrolyte or a gel electrolyte instead of these separators or if a lithium battery is prepared without using separator, there is no component for decreasing short-circuit due to softening and melting of the separator, and an alternative safety component is necessary.

Besides, particularly in a lithium ion secondary battery, a negative electrode is formed by applying a slurry comprising a negative electrode active material such as graphite, a binder such as PVDF (poly(vinylidene fluoride)) and a solvent, onto a substrate such as a copper foil which forms a collector, and drying it to form a thin film thereof. A positive electrode is formed as a thin film in the same manner onto a sabstrate such as an aluminum foil which forms a current collector. The positive electrode contains a positive electrode active material such as $LiCoO_2$, a binder and a conductive agent.

The conductive agent is used to increase an electronic conductivity at a positive electrode when the positive electrode active material has insufficient electronic conductivity. As the conductive agent, there is used carbon black (such as acetylene black) or graphite (such as artificial graphite KS-6 available from LONZA Co., Ltd.).

As mentioned above, such a battery has a problem that when a temperature of the battery increases due to internal short-circuit or the like, there is no component for decreasing short-circuit current, and large short-circuit current is generated, and thus temperature of the battery further increases due to generation of heat, leading to a further increase of short-circuit current.

The present invention has been carried out in order to solve the above problems. The object of the present invention is to provide a highly safe battery in which the increase of short-circuit current can be controlled even at temperature rise caused by generation of heat due to short-circuit by constructing the battery with an electrode in which resistance increases in accordance with temperature rise.

DISCLOSURE OF INVENTION

The first battery of the present invention comprises a solid electrolytic layer between a positive electrode and a negative electrode, wherein at least one of the positive electrode and the negative electrode comprises an active material layer containing an active material and an electronically conductive material contacted to the active material, and wherein the electronically conductive material comprises an electrically conductive filler and a resin so that resistance increases with temperature rise. According to this, since the above electronically conductive material contains the electrically conductive filler and the resin to increase resistance thereof with temperature rise, increase of current flowing into the electrode can be controlled when temperature increases due to generation of heat with short-circuit or the like and there is obtained a highly safe battery.

The second battery of the present invention comprises a gel electrolytic layer between a positive electrode and a negative electrode, wherein at least one of the positive electrode and the negative electrode comprises an active material layer containing an active material and an electronically conductive material contacted to the active material, and wherein the electronically conductive material comprises an electrically conductive filler and a resin so that resistance increases with temperature rise. According to this, since the above electronically conductive material contains the electrically conductive filler and the resin to increase resistance thereof with temperature rise, increase of current flowing into the electrode can be controlled when temperature increases due to generation of heat with short-circuit or the like and there is obtained a highly safe battery.

The third battery of the present invention comprises an electrolyte-containing porous layer comprising fine particles between a positive electrode and a negative electrode, wherein at least one of the positive electrode and the negative electrode comprises an active material layer containing an active material and an electronically conductive material contacted to the active material, and wherein the electronically conductive material comprises an electrically conductive filler and a resin so that resistance increases with temperature rise. According to this, since the above electronically conductive material contains the electrically conductive filler and the resin to increase resistance thereof with temperature rise, increase of current flowing into the electrode can be controlled when temperature increases cue to generation of heat with short-circuit or the like and there is obtained a highly safe battery.

The fourth battery of the present invention is that in any of the above first to third batteries, the resin contains a crystalline resin. According to this, by containing the crystalline resin in the resin, the rate of increase in resistance with temperature rise (changing ratio of resistance) can be improved, and there is obtained a battery capable of rapidly controlling increase of current flowing into the electrode when temperature is increased.

The fifth battery of the present invention is that in any of the above first to third batteries, a melting point of the resin is in the range of 90° C. to 160° C. According to this, by using the resin having a melting point of 90° C. to 160° C., the electronically conductive material can increase changing ratio of resistance at about a pre-determined temperature of 90° C. to 160° C., and thus characteristics of battery and safety can be coexistent with each other.

The sixth battery of the present invention is that in any of the above first to third batteries, 0.5 to 15 parts by weight of the electronically conductive material is contained in 100 parts by weight of the active material. According to this, by using the active material layer containing 0.5 to 15 parts by weight of the electronically conductive material in 100 parts by weight of the active material, resistance of the electrode before increase of changing ratio of resistance against temperature can be lowered and discharging capacitance of the battery can be increased.

The seventh battery of the present invention is that in any of the above first to third batteries, an amount of the electrically conductive filler is 40 to 70 parts by weight in the electronically conductive material. According to this, by setting the amount of the electrically conductive filler to 40 to 70 parts by weight in the electronically conductive material, changing ratio of resistance with temperature rise can be increased and normal resistance can be lowered. At the same time, discharging capacitance of the battery can be increased.

The eighth battery of the present invention is that in any of the above first to third batteries, the electronically conductive material has a particle size of 0.05 $\mu$m to 100 $\mu$m. According to this, by setting the particle size of the electronically conductive material to 0.05 $\mu$m to 100 $\mu$m, resistance of the electrode before increase of changing ratio of resistance against temperature can be lowered and discharging capacitance of the battery can be increased.

The ninth battery of the present invention is that in any of the above first to third batteries, a carbon material or an electrically conductive non-oxide is used as the electrically conductive filler. According to this, since the carbon material or the electrically conductive non-oxide is used as the electrically conductive filler, the electric conductivity of the electrode can be improved.

The tenth battery of the present invention is that in any of the above first to third batteries, the positive electrode contains a conductive agent. According to this, since the positive electrode contains the conductive agent, resistance of the electrode can be suitably controlled even in case of using the electronically conductive material having a small electronic conductivity.

The first process for preparing the battery of the present invention comprises the steps of:

(a) forming fine particles of the electronically conductive material by pulverizing an electronically conductive material comprising an electrically conductive filler and a resin;

(b) preparing an active material paste by dispersing the above fine particles of the electronically conductive material and an active material in a dispersion medium;

(c) forming an electrode by drying the above active material paste and by pressing it at a predetermined temperature T1 and a predetermined pressure; and (d) layering and laminating one of a solid electrolytic layer, a gel electrolytic layer and an electrolyte-containing porous layer comprising fine particles to the electrode.

According to this, since it comprises the steps (a) to (d), there can be prepared a battery which controls the increase of current flowing into the electrodes with temperature rise. Moreover, since this process includes the step (c), the adhesion between the electronically conductive material and the active material becomes high and the resistance of the prepared electrode can be controlled into a low value.

The second process for preparing the battery of the present invention is that in the first process, the resin contains a crystalline resin. According to this, by containing the crystalline resin in the resin, the rate of increase in resistance to temperature rise (namely, changing ratio of resistance) can be improved, and there is obtained a battery capable of rapidly controlling increase of current flowing into the electrode when temperature increases.

The third process for preparing the battery of the present invention is that in the first process, a predetermined temperature T1 is a melting point of the resin or a temperature near the melting point. According to this, by setting the predetermined temperature T1 to the melting point of the resin or the temperature near the melting point, the adhesion between the electronically conductive material and the active material is further improved and resistance of the prepared electrode can be further decreased.

BEST MODE FOR CARRYING OUT THE INVENTION

Figure 1:
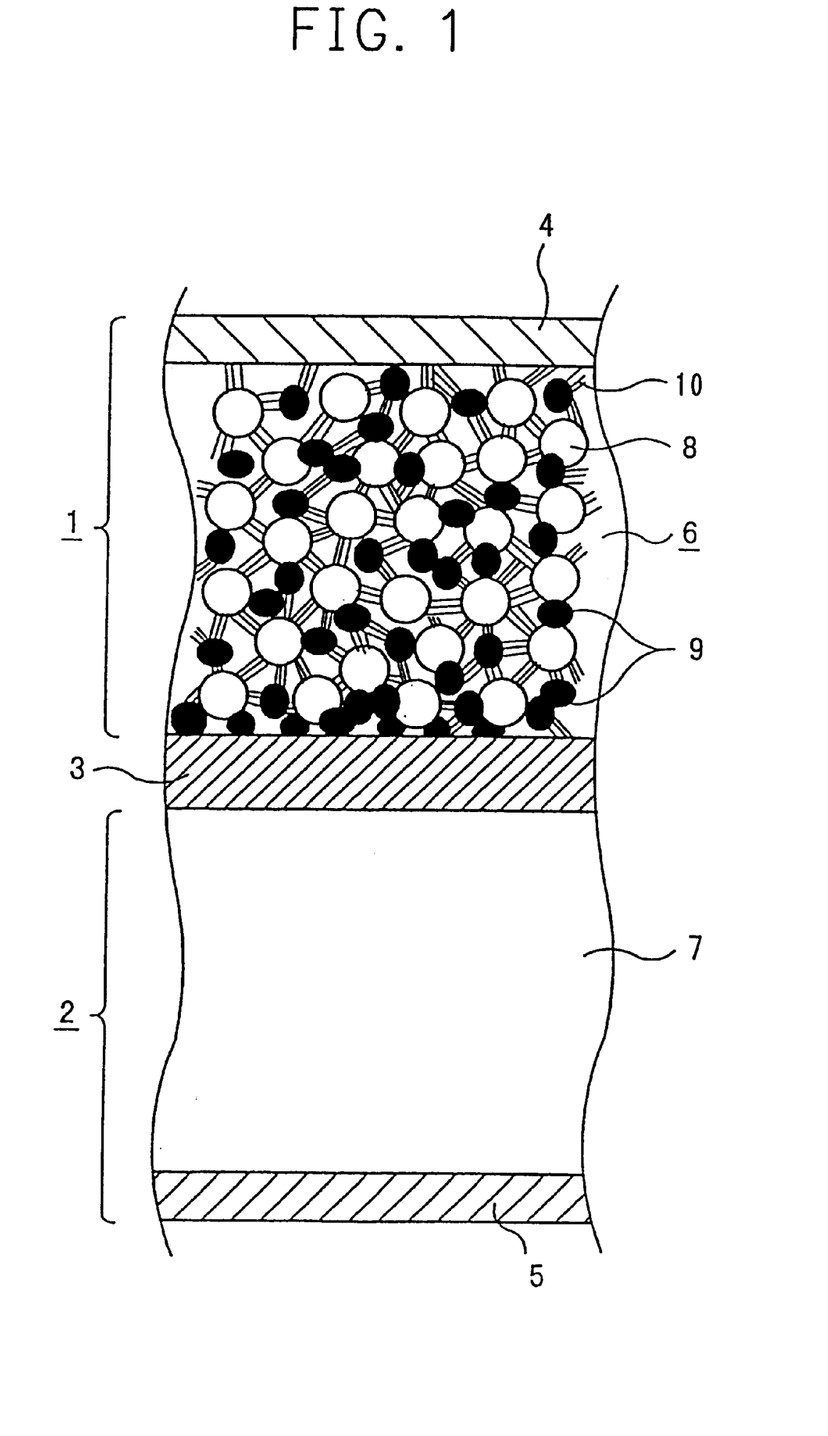
FIG. 1 is a typical sectional view illustrating structure of the battery in Example 1.

FIG. 1 is a sectional view illustrating the battery of the present invention, in particular, a longitudinal sectional view of the battery. In the figure, numeral 1 indicates a positive electrode in which the positive electrode active material layer 6 is formed on the surface of the positive electrode current collector 4, numeral 2 a negative electrode in which the negative electrode active material layer 7 is formed on the surface of the negative electrode current collector 5 and numeral 3 an electrolyte-containing layer placed between the positive electrode 1 and the negative electrode 2. The electrolyte-containing layer 3 comprises a solid electrolytic layer, a gel electrolytic layer or a porous layer constituted by fine particles and containing an electrolyte containing lithium ion.

The positive electrode active material layer 6 is obtained by bonding the positive electrode active material 8 and the electronically conductive material 9 with the binder 10 to form it on the surface of the positive electrode current collector 4 comprising a metal film (for example, an aluminum film). The electronically conductive material 9 comprises an electrically conductive filler and a resin or a crystalline resin, and it has a property that changing ratio of resistance against temperature is increased with temperature rise (hereinafter, the property is referred to as PTC (Positive Temperature Coefficient)).

The positive electrode active material 8 is a particle. The electronically conductive material 9 is a particle having a smaller size than that of the positive electrode active material 8. The size of the electronically conductive material 9 is preferably 0.05 $\mu$m to 100 $\mu$m, and the shape may be a fibrous or flaky small piece. Namely, the shape of the electronically conductive material 9 may be any shape having such a size that the electronically conductive material 9 can be disposed among the adjoining positive electrode active material 8.

In order to improve the following PTC properties (namely, in order to increase a rate of change in resistance), it is preferable that the resin contains a crystalline resin.

The electronically conductive material 9 has a property that a rate of change in resistance is increased in a temperature range of, for example, 90° C. to 160° C.

The function of PTC is revealed, because the resistance of the electronically conductive material 9 itself is increased due to softening, melting and volume expansion of the resin or the crystalline resin contained in the electronically conductive material 9.

As the electrically conductive filler, there can be used a carbon material, an electrically conductive non-oxide or the like. Examples of the carbon material are carbon black such as acetylene black, furnace black, lamp black; graphite; carbon fiber; and the like. Examples of the electrically conductive non-oxide are a metal carbide, a metal nitride, a metal silicide, a metal boride and the like. Examples of the metal carbide are TiC, ZrC, VC, NbC, TaC, $Mo_2C$, WC, $B_4C$, $Cr_3C_2$ and the like. Examples of the metal nitride are TiN, ZrN, VN, NbN, TaN, $Cr_2N$ and the like. Examples of the metal boride are $TiB_2$, $ZrB_2$, $NbB_2$, $TaB_2$, CrB, MoB, WB and the like.

Moreover, the resin and the crystalline resin mean polymers such as a high density polyethylene (having a melting point of 130° C. to 140° C.), a low density polyethylene (having a melting point of 110° C. to 112° C.), a polyurethane elastomer (having a melting point of 140° C. to 160° C.) and poly(vinyl chloride) (having a melting point of about 145° C.), whose melting points are in the range of 90° C. to 160° C.

In the electronically conductive material 9, a temperature of PTC expression depends on the melting point of the resin or the crystalline resin contained in the electronically conductive material 9. Thus, the temperature of PTC expression can be controlled in a range of 90° C. and 160° C. by changing a material of the resin.

PTC property may be a reversible property that resistance is returned to the original resistance when the temperature is lowered after expression of the PTC function, or may be irreversible property.

A temperature of PTC expression is preferably at most 90° C. from the viewpoint of safty guarantee. But resistance at the electrode is be increased at a temperature range in which a battery is usually used, and thus the battery performance such as discharge load characteristics is lowered.

Also, when a temperature of PTC expression is more than 160° C., the inside temperature of the battery is increased to this temperature, which is not preferable from the viewpoint of safty guarantee. Therefore, in the electronically conductive material 9, it is preferable to set the temperature of PTC expression in the range of 90° C. to 160° C.

Since the temperature of PTC expression depends on the melting point of the resin or the crystalline resin, the resin or the crystalline resin having melting point of 90° C. to 160° C. is selected.

Also, in a usual condition, i.e. before PTC function is expressed, resistance of the electrode can be adjusted by changing a ratio of the electronically conductive material 9 to the total positive electrode active material layer 6. And 0.5 to 15 parts by weight of the electronically conductive material 9 is preferably contained in 100 parts by weight of the active material.

Moreover, an amount of the electrically conductive filler in the electronically conductive material 9 is preferably 40 to 70 parts by weight from the view point to increase a changing ratio of resistance at the electrode with temperature rise to lower resistance at a usual condition and to increase the discharging capacitance of the battery.

As the positive electrode active material 8, it is possible to use a composite oxide of lithium and a transition metal such as cobalt, manganese or nickel; a chalcogen compound including lithium; a composite compound thereof; a material in which various additional elements are added to the above composite oxide, the chalcogen compound or the composite compound; and various materials depending upon the sort of the battery.

The negative electrode active material layer 7 is obtained by forming a material obtained by bonding a negative electrode active material such as carbon particles with a binder on the surface of the negative electrode current collector 5 comprising a metal film (a copper film, for example). As the negative electrode active material used for forming the negative electrode active material layer 7, it is possible to use a carbon material and the like, which enables lithium ions to pass, and various materials depending upon the sort of the battery.

As the positive electrode current collector 4 and the negative electrode current collector 5, any metal stable in the battery can be used. As the positive electrode current collector 4, aluminum can be preferably used, while as the negative electrode current collector 5, copper can be preferably used. As shape of the collector 4 and 5, any of foil, mesh, and expanded metal and the like can be used. Among those, shape having a large surface area such as mesh and expanded metal is preferable from the view point to provide a jointing strength to the active material layer 6 or 7 and to easily impregnate the layer with an electrolytic solution after the jointing.

As a material used for the electrolyte-containing layer 3, there can be used a solid polymer electrolyte layer comprising a solid solution of polyethylene oxide polymer and lithium salt, a gel electrolytic layer obtained by gelling electrolytic solution with polymer or a porous layer comprising fine particles.

As a process for forming the gel electrolytic layer, there are a process of mixing an electrolyte with a monomer to polymerize and cure the mixture and a process of swelling a preliminarily polymerized polymer in an electrolytic solution. As a monomer forming the gel electrolyte, an acrylate monomer, a methacrylate monomer having ethylene oxide chain and the like are preferable from a view point of excellent polymerization property and electrolyte containing ability. As a polymerization initiator, azobisisobutyronitrile and the like can be used.

As a process for forming a porous layer comprising fine particles, the porous layer is obtained by dispersing a binder (such as PVDF) and a filler comprising alumina and the like in a dispersion medium such as N-methylpyrolidone (hereinafter referred to as "NMP"). Then the binder and the electrolytic solution are retained in the pores of this porous layer. Examples of the filler are an oxide such as $Al_2O_3$, $SiO_2$, $ZrO_2$ or $LiAlO_2$, a carbide such as SiC, $B_4C$, or ZrC, a nitride such as SiN, BN or TiN, a polymer such as a polyorefin resin, poly(methylmethacrylate), an inorganic salt such as $LiPF_6$ or $LiClO_4$, and the like. An average particle size of the filler is preferably at most that of the electrode active material.

As the electrolytic solution, there can be used solutions in which an electrolyte such as $LiPF_6$, $LiClO_4$, $LiBF_4$, $LiCF_3SO_3$, $LiN(CF_3SO_2)_2$ or $LiC(CF_3SO_2)_3$ is dissolved in a single or mixed solvent of an ether such as dimethoxyethane, diethoxyethane, dimethyl ether or diethyl ether or of an ester such as ethylene carbonate or propylene carbonate, or various electrolytic solutions depending on the sort of the battery.

In the positive electrode 1 as shown in FIG. 1, the electronically conductive material 9 itself contained in the positive electrode active material layer 6 has PTC properties, and thus when a temperature at the electronically conductive material 9 of the positive electrode 1 becomes higher than the temperature of PTC expression, resistance of the positive electrode active material layer 6 is increased.

Therefore, when an electrode (which is herein applied to the positive electrode) having such properties is applied to the battery, and in case where current is increased due to short-circuit outside or inside the battery and a temperature of the battery or the electrode is increased at least to some extent, resistance of the positive electrode active material layer 6 itself is increased, and thereby current flowing inside the battery is inhibited.

Therefore, when the battery is formed by using this electrode, there are advantageous effects that safety of the battery is remarkably improved and is maintained even in an unusual situation such as short-circuit in severe conditions, reversed charge or overcharge.

FIG. 1 illustrated the positive electrode active material layer 6 comprising the positive electrode active material 8, the electronically conductive material 9 and the binder 10 as an example, but it is not limited thereto. For example, when using such a material that the positive electrode active material 8 contained in the positive electrode active material layer 6 has low electronic conductivity, an additional conductive agent is added to the positive electrode active material layer 6 to supplement low electronic conductivity.

There is disclosed a structure of the positive electrode 1, in particular, that of the electronically conductive material comprising the electrically conductive filler and the resin or the crystalline resin in the positive electrode active material layer 6. However, it is not limited thereto, and a similar effect is also seen even when the above structure is applied to the negative electrode 2 to form a battery.

Hereinafter, there will be explained processes for preparing the positive electrode 1 and the negative electrode 2 shown in FIG. 1, and a process for preparing the battery using the positive electrode 1 and the negative electrode 2.

Process for Preparing Positive Electrode

An electronically conductive material having sufficiently low volume specific resistance at a room temperature and high volume specific resistance at a temperature higher than the predetermined temperature of 90° C. to 160° C. (such as a pellet prepared by mixing fine particles of the electrically conductive filler and a resin or a crystalline resin in a predetermined ratio) was finely pulverized to obtain fine particles of the electronically conductive material.

As a method of pulverizing the electronically conductive material, it is preferable to use compressed air or compressed inert gas such as nitrogen or argon. In particular, in case of downsizing the particle size, the above gas is used to generate an ultrasonic air flow and the particles of the electronically conductive material are collided with each other or with wall surface (not shown) in the air flow to obtain an electronically conductive material having a smaller particle size. Hereinafter, the method for preparing fine particles thereby is referred to as Jet Mill method.

Also, if the particle size of the fine particles of the electronically conductive material need not to be too small, there may be used a method of rotating the electronically conductive material in a ball mill for pulverization instead of using compressed air. This method for preparing fine particles is referred to as Ball Mill method.

Then, the fine particles of the electronically conductive material, the positive electrode active material (such as $LiCoO_2$), and the binder (such as PVDF) are dispersed in a dispersion medium (such as NMP) to prepare a paste for the positive electrode active material.

Next, the above paste for the positive electrode active material is applied onto the current collector base material (such as a metal film having the predetermined thickness), which forms the positive electrode current collector 4.

Furthermore, after drying it, pressing is effected at the predetermined temperature with the predetermined surface pressure and the positive electrode active material layer 6 having a desirable thickness is formed to obtain the positive electrode 1.

According to the above-mentioned process for preparing the positive electrode 1, since the pressing is effected at the predetermined temperature with the predetermined surface pressure, adhesion between the electronically conductive material 9 and the positive electrode active material 8 is improved and resistance of the electrode at a usual condition can be lowered.

That is, by controlling the temperature and the pressure (herein, surface pressure) in the pressing of the electrode, resistance of the obtained electrode can be adjusted. In particular, when the predetermined temperature is set to the melting point or near the melting point of the resin or the crystalline resin contained in the electronically conductive material, adhesion between the electronically conductive material 9 and the active material 8 is further improved and resistance of the electrode at a usual condition can be further lowered.

Herein, there has been illustrated a case where the positive electrode active material paste is pressed at the predetermined temperature with the predetermined surface pressure. However, the positive electrode 1 may be obtained by heating the positive electrode active material paste at the predetermined temperature (preferably, at the melting point or a temperature near the melting point) after pressing the paste at the predetermined surface pressure.

Hereinafter, a process for preparing the negative electrode 2 is explained.

Process for Preparing Negative Electrode

A negative electrode active material such as mesophase carbon micro-beads (hereinafter referred to as "MCMB") and PVDF are dispersed in NMP to prepare a paste for the negative electrode active material. Then the paste is applied onto the metal film of the predetermined thickness, which forms the negative electrode current collector to obtain the negative electrode 2 comprising the negative electrode active material layer 7.

Process for Preparing Electrolyte-containing Layer

In case of the solid electrolytic layer, lithium salt is dissolved in polyethylene oxide heated to at least 120° C., and it was applied onto the surface of the negative electrode or the positive electrode to obtain an electrode-electrolyte layer. On the other hand, in case of the porous is layer comprising fine particles, a solution obtained by dispersing PVDF and alumina in NMP is applied onto the electrode surface to obtain an electrode-electrolyte layer.

Hereinafter, a process for preparing a battery is explained.

Process for Preparing Battery

A battery having the positive electrode and negative electrode was obtained by laminating the negative electrode-electrolyte layer with the positive electrode. In the battery prepared according to the above process, safety of the battery itself is improved because increase of short-circuit current can be controlled even when short-circuit happens outside or inside the battery and a temperature of the battery is increased due to increase of resistance of the positive electrode and resistance of the interface between the positive electrode and the separator with temperature rise.

In the above preparation process, the electronically conductive material was contained in the positive electrode 1, but the electronically conductive material may be contained in the negative electrode 2 or in both of the positive electrode 1 and the negative electrode 2.

More concrete examples of the present invention will be illustrated below. However, the present invention is not intended to be limited to these examples.

EXAMPLE 1

Process for Preparing Positive Electrode

An electronically conductive material having volume specific resistance of 0.2 Ω·cm at a room temperature and a volume specific resistance of 20 Ω·cm at 135° C. (comprising a mixture of 60 parts by weight of carbon black in the form of fine particles and 40 parts by weight of polyethylene, for example) was finely pulverized according to Jet Mill method to obtain fine particles of the electronically conductive material.

Then, 6 parts by weight of the electronically conductive material in the form of fine particles, 91 parts by weight of a positive electrode active material ($LiCoO_2$), and 3 parts by weight of a binder (PVDF) were dispersed in NMP as a dispersion medium to obtain a paste for the positive electrode active material.

Then, the above positive electrode active material paste was applied onto a metal film (herein an aluminum foil) having a thickness of 20 $\mu$m which forms the positive electrode current collector 4 according to Doctor Blade method. Furthermore, it was dried at 80° C., and was pressed at a room temperature with a surface pressure of 2 ton/cm$^2$ to form a positive electrode active material layer 6 having a thickness of approximately 100 $\mu$m to obtain the positive electrode 1.

Process for Preparing Negative Electrode

A paste for the negative electrode active material was prepared by dispersing 90 parts by weight of MCMB and 10 parts by weight of PVDF in NMP. The paste was applied onto a negative electrode current collector comprising a copper foil having a thickness of 20 $\mu$m according to Doctor Blade method to form the negative electrode 2 comprising the negative electrode active material layer 7.

Process for Preparing Electrolyte-containing Layer

In NMP, 10% by weight of PVDF and 10% by weight of alumina powder having an average diameter of 0.01 $\mu$m (available from Degussa Co., Ltd.) were dissolved and dispersed, and the mixture was applied, in a thickness of 20 $\mu$m, onto the negative electrode surface by using a screen-printing machine of 200 mesh to obtain an electrode-electrolyte layer.

Process for Preparing Battery

The negative electrode-electrolyte layer prepared by the above process was laminated with the positive electrode to obtain a battery having one pair of the positive electrode and the negative electrode.

Evaluation of Electrodes and Battery

In order to evaluate electrodes and a battery of the present invention, the following manners were employed:

Measurement of Electrode Resistance

Aluminum foil was fused on both surfaces of the produced electrodes. Then, the plus-side voltage terminal and plus-side current terminal were connected onto one surface of one aluminum foil, while the minus-side voltage terminal and minus-side current terminal were connected onto the other aluminum foil. A heater is connected to the terminals, and by increasing a temperature of the electrode at a ratio of 5° C./min, voltage drop of the device through which a constant current was flowed was measured to obtain resistance was measured (herein volume specific resistance (Ω·cm)).

Capacitance Test

Both of the prepared positive and negative electrodes were cut into a part having size of 14 mm×14 mm, and a porous polypropylene sheet (available from Hochst Co., Ltd.; Trade-name: CELLGUARD #2400), which is used as separator 3, was interposed between the positive and negative electrodes and both electrodes were laminated to prepare a battery body. The current collector terminals were mounted to each of the positive and negative electrodes of the battery body by spot-welding. The battery body was placed into a bag made of an aluminum-laminated sheet. An electrolytic solution was put thereinto, and the bag was sealed to prepare a single battery. A charge-discharge test of this battery was carried out at a room temperature.

Short-Circuit Test

The prepared positive and negative electrodes were cut into a part having size of 14 mm×14 mm, respectively, and a porous polypropylene sheet (available from Höchst Co., Ltd.; Trade-name: CELLGUARD #2400) was interposed between the positive and negative electrodes, and ten pairs of the laminated were layered. By connecting the current collector terminals, which are mounted to each edge of the positive and negative electrode current collector, to each other by spot-welding both at the positive and negative electrode sides, each pair was connected in electrically parallel to prepare a battery body.

This battery body was placed into a bag made of an aluminum-laminated sheet. Thereto was added an electrolytic solution which was obtained by dissolving lithium hexafluorophosphate in a mixed solvent of ethylene carbonate and diethyl carbonate (in a molar ratio of 1:1) in a concentration of 1.0 mol/dm$^3$. Then, the bag was sealed by thermal fusing to prepare a battery.

The battery was charged at room temperature to 4.1 volts in 8.0 mA. After completion of charging, a temperature of the battery was gradually increased from a room temperature. And the positive and negative electrodes were short-circuited at a predetermined temperature, and then the current value at the point was measured.

Comparative Example 1

For comparison, an artificial graphite KS-6 (available from LONZA Co., Ltd.) was used as an electronically conductive material. And 6 parts by weight of the artificial graphite KS-6 in the form of fine particles, 91 parts by weight of a positive electrode active material (LiCoO$_2$) and 3 parts by weight of a binder (PVDF) were dispersed in NMP as a dispersion medium to obtain a paste for the positive electrode active material paste. Then, this positive electrode active material paste was applied onto a metal film (herein an aluminum foil) having a thickness of 20 μm which forms the positive electrode current collector 4 according to Doctor Blade method. Furthermore, it was dried at 80° C., and was pressed at a room temperature with a surface pressure of 2 ton/cm$^2$ to form the positive electrode active material layer 6 having a thickness of approximately 100 μm to obtain a positive electrode was obtained. By using this positive electrode, a battery was prepared in the same manner of preparing the negative electrode, the electrolyte-containing layer and the battery as in Example 1.

Table 1 shows characteristics of the battery in Example 1, together with those in Comparative Example 1, in particular, volume specific resistance of the electrode, changing ratio of the volume specific resistance, and discharging capacitance of the battery.

In Table 1, changing ratio of resistance means the value which is obtained by dividing the volume specific resistance after PTC expression by the one before PTC expression.

TABLE 1

| | Volume specific resistance (Ω · cm) | Changing ratio of resistance | Discharging Capacitance (mAh) |
|---|---|---|---|
| Ex. 1 | 100 | 50 | 4.3 |
| Com. Ex. 1 | 60 | 1.1 | 4.3 |

As shown in TABLE 1, changing ratio of resistance is smaller in Comparative Example 1 than that in Example 1, because the crystalline resin is not contained in the electrically conductive material in Comparative Example 1.

It is found that in Example 1, since the crystalline resin is contained in the electrode, particularly in the electronically conductive material of the positive electrode active material layer of the positive electrode, the resistance after PTC expression is increased as fifty times as larger than the resistance before PTC expression.

Therefore, when a battery is formed by using this electrode, function of PTC is revealed when a temperature inside the battery becomes higher than the predetermined temperature and the increase of short-circuit current can be inhibited and thus safety and reliability of the battery is further improved.

In Example 1, the battery having 50 of a changing ratio of resistance was shown. However, the present invention is not intended to be limited thereto. The above effect can be obtained when the changing ratio of resistance is approximately 1.5 to 10000.

Figure 2:
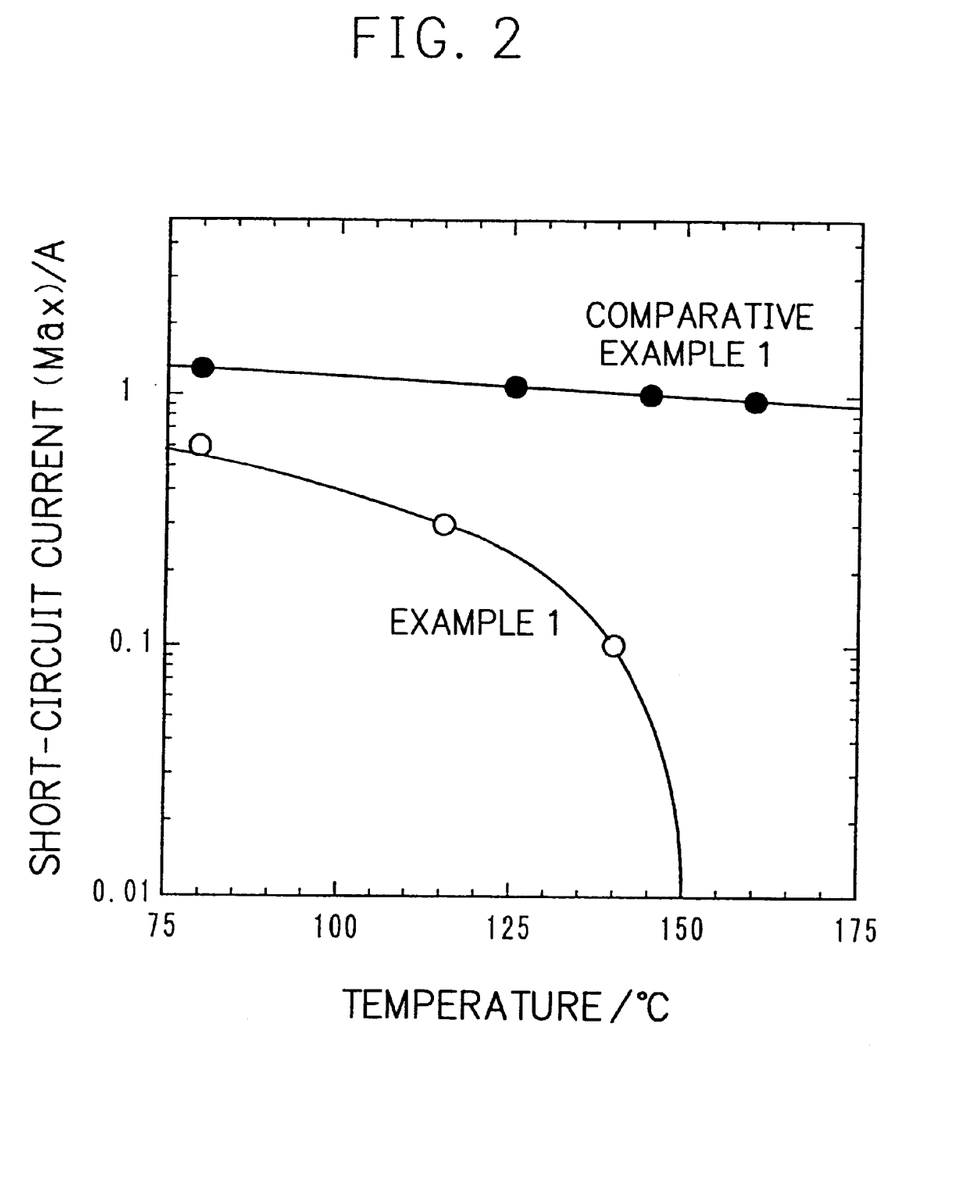
FIG. 2 illustrates relationship between an electrode temperature and short-circuit current of the battery in a short-circuit current test at each temperature in Example 1.

FIG. 2 illustrates the relationship between each temperature and the value of maximum current in short-circuit current test for the battery of Example 1 and Comparative Example 1.

The PTC function of the battery in Example 1 is revealed when a temperature is increased the pre-determined temperature, and the maximum short-circuit current suddenly become smaller when short-circuit is carried out at a temperature higher than about 120° C. However, in the battery of Comparative Example 1, short-circuit current value remains high even at a temperature higher than this temperature.

Comparing Example 1 with Comparative Example 1, the crystalline resin is contained in the electrode, particularly in the electronically conductive material of the positive electrode active material layer of the positive electrode of Example 1. Thus, by forming a battery using this electrode, the function of PTC is revealed when the temperature inside the battery becomes higher than the predetermined temperature and the increase of short-circuit current can be inhibited before the temperature of the battery exceeds 160° C. Therefore, safety and reliability of the battery are further improved.

Comparative Example 2

Figure 3:
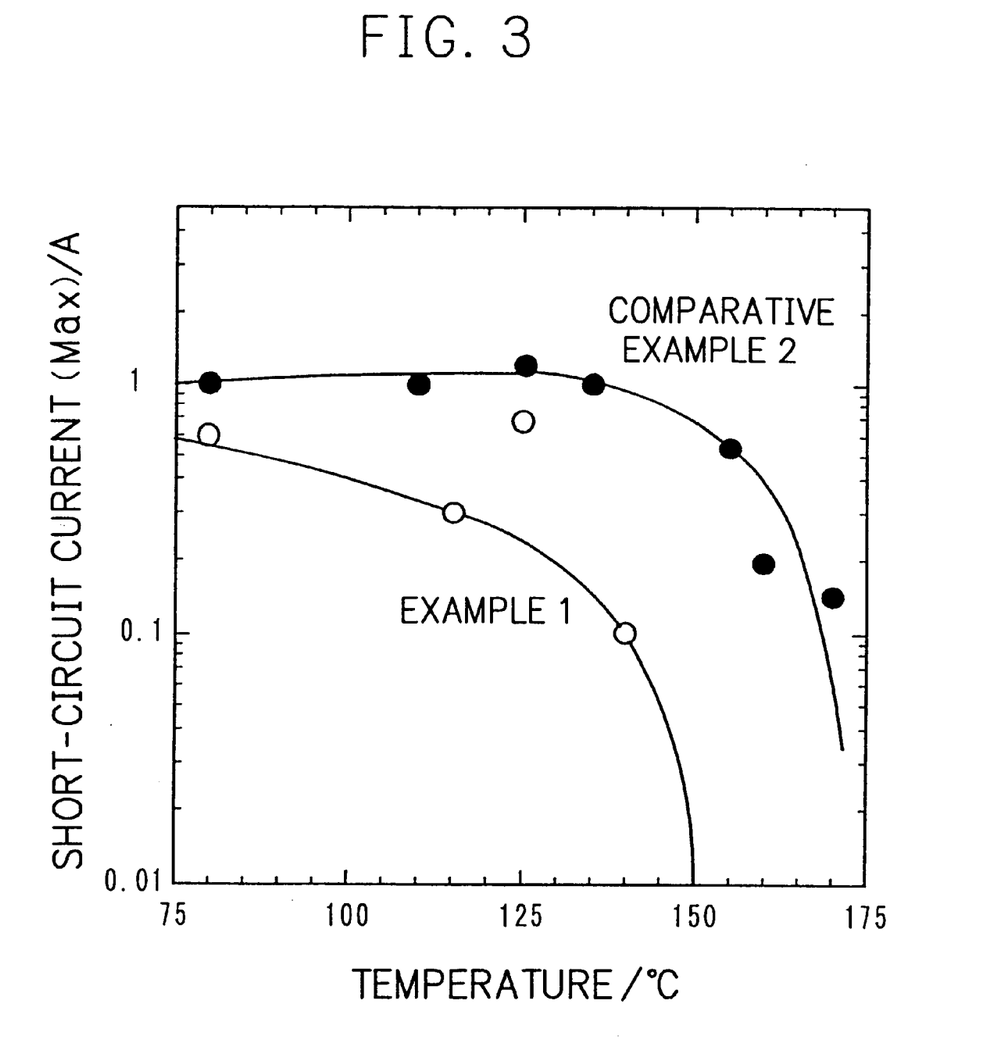
FIG. 3 illustrates relationship between an electrode temperature and short-circuit current of the battery in a short-circuit current test at each temperature in Example 1.

As the electronically conductive material 9, pellets of a mixture of 60 parts by weight of carbon black in the form of fine particles and 40 parts by weight of a polypropylene resin (a melting point of 168° C.) were finely pulverized according to Jet Mill method to obtain fine particles of the electronically conductive material. Then, a positive electrode was formed in the same manner as in Example 1 except for the above. By using this positive electrode, a battery was prepared in the same manner as in Example 1.

FIG. 3 illustrates relationship between each temperature and the value of maximum current in short-circuit current test for the battery of Example 1 and Comparative Example 2.

As shown in the figure, the temperature of PTC expression was higher than 160° C. in Comparative Example 2. From this result, it is considered that because the polypropylene resin having a melting point of 168° C. was used as the crystalline resin, when the electrode containing the polypropylene resin was used for the battery, the temperature of PTC expression becomes higher than 160° C.

On the other hand, in Example 1, polyethylene having a melting point lower than 160° C. was used as the crystalline resin, and thus the increase of short-circuit current was controlled before the temperature exceeded 160° C., and safety and reliability of the battery are further improved.

PTC effect functions at a temperature of at least 120° C. to decrease short-circuit current in the battery of Example 1, while a temperature of PTC expression is higher, and decrease of short-circuit current can be confirmed only after the temperature becomes at least 160° C. in the battery of Comparative Example 2.

This is because the melting point of the crystalline resin (herein polypropylene) contained in the electronically conductive material is higher.

Therefore, if the crystalline resin having a melting point of 90° C. to 160° C. is selected as the crystalline resin contained in the electronically conductive material 9, the performance of the battery is not decreased and the PTC expression temperature can be lower than 160° C.

Comparative Example 3

As an electronically conductive material, pellets of a mixture of 38 parts by weight of carbon black and 62 parts by weight of polyethylene were finely pulverized according to Jet Mill method to obtain fine particles of the electronically conductive material. Then, a positive electrode was formed in the same manner as in Example 1 except for the above. By using this positive electrode, a battery was prepared in the same manner as in Example 1.

Comparative Example 4

As an electronically conductive material, pellets of a mixture of 71 parts by weight of carbon black and 29 parts by weight of polyethylene were finely pulverized according to Jet Mill method to obtain fine particles of the electronically conductive material. Then, a positive electrode was formed in the same manner as in Example 1 except for the above. By using this positive electrode, a battery was prepared in the same manner as in Example 1.

Table 2 shows volume specific resistance of the electrode, changing ratio of resistance with temperature rise, value of discharging capacitance at 2C (C: time rate) of the battery, and the maximum short-circuit current at 140° C., comparing Example 1 with Comparative Examples 3 and 4.

TABLE 2

| | Volume specific Resistance ($\Omega \cdot cm$) | Changing ratio of resistance at temperature rise | Discharging capacitance (mAh) | Maximum Short-circuit Current at 140° C. (mA) |
|---|---|---|---|---|
| Ex. 1 | 100 | 50 | 4.3 | 0.1 |
| Com. Ex. 3 | 521 | 112 | 1.1 | 0.07 |
| Com. Ex. 4 | 62 | 1.7 | 4.3 | 1.2 |

As shown in Table 2, the changing ratio of resistance is larger, resistance of the electrode is higher and discharging capacitance became lower in Comparative Example 3 in comparison with Example 1.

Furthermore, in Comparative Example 4, while discharging capacitance was higher than that of Example 1. But decrease of short-circuit current was not found in short-circuit test, because the PTC function is insufficient due to a high ratio of the carbon black.

Therefore, by changing the ratio of the electrically conductive filler contained in the electronically conductive material, the changing ratio of resistance of the electrode and discharging capacitance of the battery can be adjusted to a suitable value.

In particular, by setting an amount of the electrically conductive filler contained in the electrode to 40 to 70 parts by weight, resistance of the electrode at a usual condition (namely, before PTC expression) can be lowered, changing ratio of resistance of the electrode can be increased, and furthermore, the discharging capacitance can be increased when this electrode is used to constitute a battery.

Moreover, by setting an amount of the electrically conductive filler contained in the electronically conductive material to 50 to 68 parts by weight, characteristics of the electrode and the battery shown in Table 2 can be more preferable.

EXAMPLE 2

Figure 4:
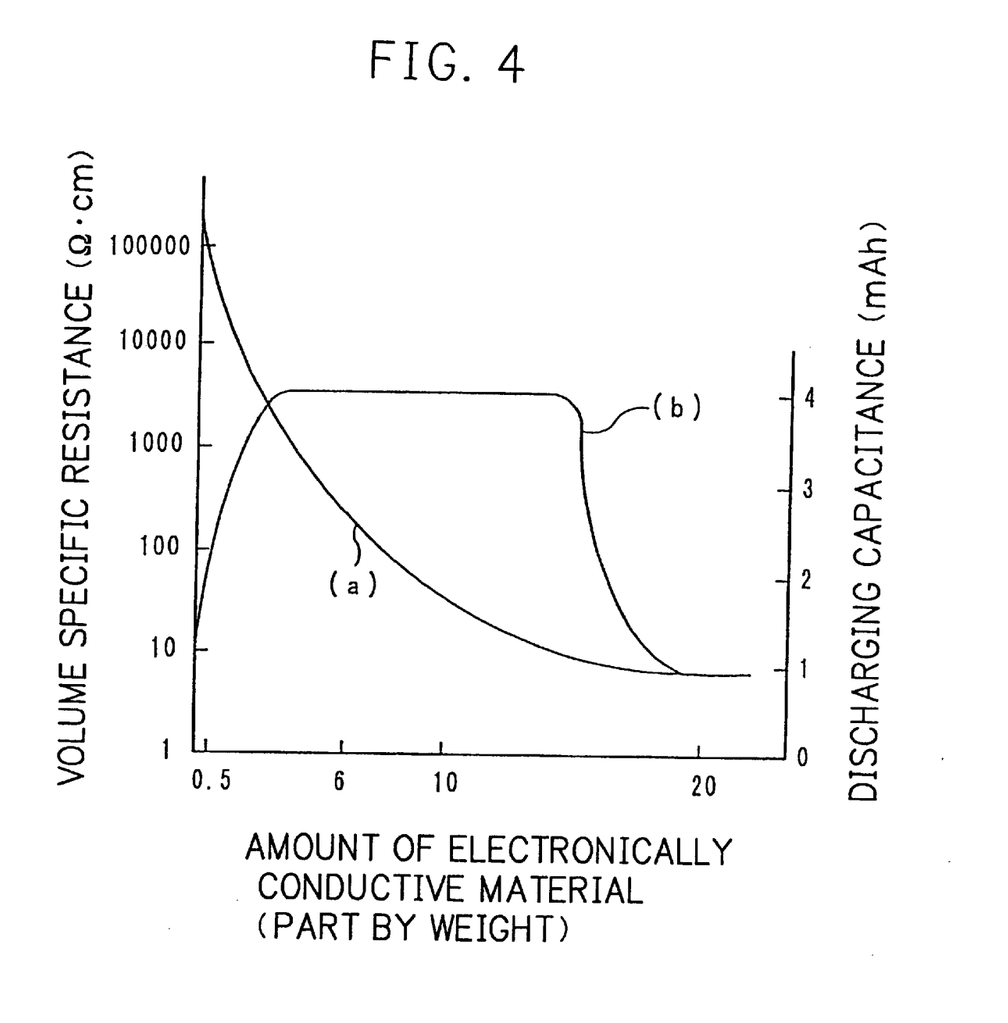
FIG. 4 illustrates relationship between an amount of the electronically conductive material and volume specific resistance of the electrode and relationship between an amount of the electronically conductive material and discharging capacitance of the battery in Example 2.

The ratio of the electronically conductive material in preparation of the positive electrode in Example 1 was varied. FIG. 4 illustrates the relationship between a ratio of the electronically conductive material and volume specific resistance of the electrode and relationship between a ratio of the electronically conductive material and discharging capacitance. Specifically, FIG. 4 illustrates relationship between a ratio of the electronically conductive material to 100 parts by weight of the total solid content of the electrode (herein the positive electrode) of the battery and volume specific resistance of the electrode ((a) in the figure), and relationship between a ratio of the electronically conductive material to 100 parts by weight of the total solid content of the electrode (herein the positive electrode) of the battery and discharging capacitance ((b) in the figure).

As shown in the figure, when an amount of the electronically conductive material is at most 0.5 part by weight, usual resistance of the electrode becomes excessively high, discharging capacitance becomes small and thus, there are problems in battery performance. Also, when at least 15 parts by weight thereof is used, an amount of the active material is decreased, and thereby discharging capacitance becomes small.

Therefore, by setting the amount of the electronically conductive material to 0.5 to 15 parts by weight based on 100 parts by weight of the total solid content of the electrode, usual resistance of the electrode can be lowered and discharging capacitance of the battery using this electrode can be increased. More preferably, by setting the electronically conductive material to 0.7 to 12 parts by weight, most preferably, 1 to 10 parts by weight, a further desirable battery can be prepared.

EXAMPLE 3

Figure 5:
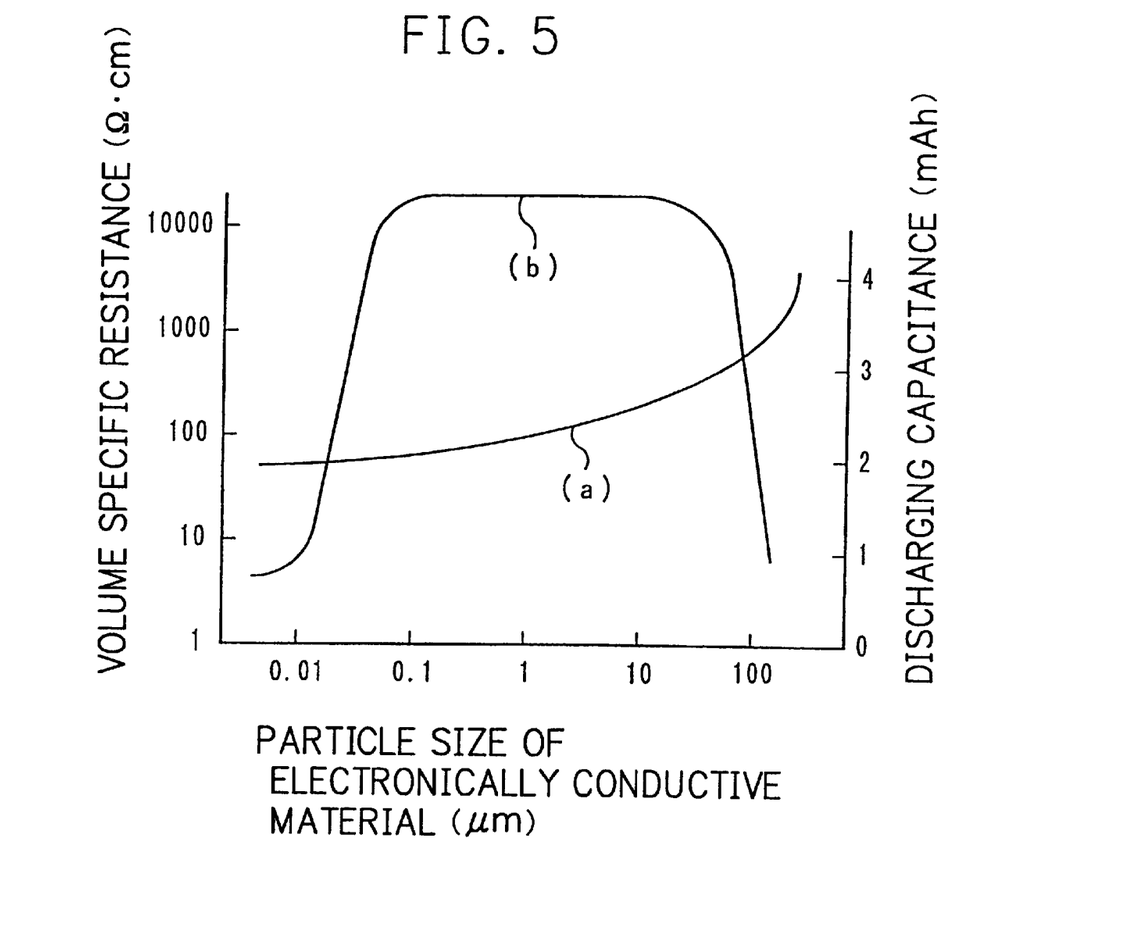
FIG. 5 illustrates relationship between a particle size of the electronically conductive material and volume specific resistance of the electrode and the relationship between the particle size of the electronically conductive material and discharging capacitance of the battery in Example 3.

Particle size of the electronically conductive material in preparation of the positive electrode in Example 1 was varied. FIG. 5 illustrates the relationship between the particle size of the electronically conductive material and the resistance of the electrode ((a) in the figure) and the relationship between the particle size of the electronically conductive material and the discharging capacitance ((b) in the figure).

When the particle size of the electronically conductive material is at most 0.05 μm, a filling ratio of the electronically conductive material is decreased, which means that volume of the electronically conductive material per a unit volume of the positive electrode active material layer is increased, namely that an amount of the positive electrode active material is decreased. Therefore, when the particle size of the electronically conductive material is at most 0.05 μm, discharging capacitance is decreased. On the other hand, when the particle size of the electronically conductive material is at least 100 μm, resistance of the electrode itself is increased and discharging capacitance is decreased.

Accordingly, by setting the average particle size of the electronically conductive material to 0.05 to 100 μm, usual resistance of the electrode can be lowered and discharging capacitance can be increased. By setting the average particle size of the electronically conductive material to 0.1 to 50 μm, more preferably 0.5 to 20 μm, volume fraction of the electronically conductive material, volume specific resistance of the electrode itself, and discharging capacitance can be further desirable value.

EXAMPLE 4

Pellets of an electronically conductive material (prepared by mixing 60 parts by weight of carbon black in the form of fine particles and 40 parts by weight of polyethylene) having volume specific resistance of 0.2 Ω·cm at a room temperature and volume specific resistance of 20 Ω·cm at 135° C. were finely pulverized by using Ball Mill to obtain fine particles of the electronically conductive material.

By using this fine particles of the electronically conductive material, an electrode (herein a positive electrode) was prepared in the same manner as in Example 1, and furthermore, a battery was prepared in the same manner of preparing the negative electrode and the battery as in Example 1.

Table 3 shows the average particle size of the electronically conductive material, resistance of each electrode, and discharging capacitance of the battery.

In this example, since the electronically conductive material was pulverized according to Ball Mill method, the average particle size of the obtained electronically conductive material particles become larger.

As a result, volume specific resistance is increased and discharging capacitance is decreased, but the battery can be used in practice.

TABLE 3

| | Average particle size of the electronically conductive material (μm) | Volume specific Resistance (Ω · cm) | Discharging Capacitance (mAh) |
|---|---|---|---|
| Ex. 1 | 9.1 | 100 | 4.3 |
| Ex. 4 | 52.3 | 932 | 2.8 |

As the results show, it is found that in order to achieve lower usual resistance of the electrode and higher discharging capacitance of the battery, it is preferable to pulverize the electronically conductive material according to Jet Mill method.

EXAMPLE 5

This example is characterized in that in Example 1, the positive electrode active material paste was applied onto an aluminum foil, dried at 80° C., and thereafter was pressed at 135° C. with a pressure of 0.5 ton/cm² for 30 minutes to prepare an electrode (herein a positive electrode). In this example, the preparation methods of the negative electrode, the electrolyte-containing layer and the battery are the same as those in Example 1.

Table 4 shows characteristics of the electrode and the battery of this example, together with those of Example 1.

TABLE 4

| | Porosity (%) | Volume specific resistance (Ω · cm) | Discharging Capacitance (mAh) |
|---|---|---|---|
| Ex. 1 | 30 | 100 | 4.3 |
| Ex. 5 | 25 | 87 | 4.3 |

As shown in Table 4, since the dried positive electrode active material paste was pressed at a temperature near the melting point of the crystalline resin contained in the electronically conductive material in this example, adhesion between the electronically conductive material and the active material is improved. Therefore, resistance of the electrode in a usual condition can be controlled to a low value.

This means that the resistance of the obtained electrode can be controlled by controlling the temperature or the pressure (herein surface pressure) in pressing the dried positive electrode active material paste.

In particular, by setting the temperature of pressing the dried positive electrode active material paste to the melting point or near the melting point of the crystalline resin contained in the electronically conductive material, volume specific resistance of the obtained electrode at a usual condition can be small even if the pressure is lowered to some extent since the paste is pressed at a temperature near the melting point of the crystalline resin.

EXAMPLE 6

Process for Preparing Positive Electrode

Pellets of an electronically conductive material (prepared by mixing carbon black and polyethylene in a predetermined ratio, for example) having a volume specific resistance of 0.2 Ω·cm at a room temperature and a volume specific resistance of 500 Ω·cm at an operating temperature of 135° C. were finely pulverized according to Jet Mill to obtain fine particles having an average particle size of 9.0 μm.

A mixture of 4.5 parts by weight of the fine particles of the electronically conductive material, 1.5 parts by weight of artificial graphite KS-6 (available from LONZA Co., Ltd.) as a conductive agent, 91 parts by weight of an active material (LiCoO₂) and 3 parts by weight of a binder (PVDF) was dispersed in NMP as a dispersion medium to obtain a paste for the positive electrode active material.

Then, the above paste for the positive electrode active material was applied onto a metal film (herein an aluminum foil) having a thickness of 20 μm, which forms the positive electrode current collector 4, according to Doctor Blade method. Then, it was dried at 80° C., pressed at a predetermined temperature (for example, at a room temperature) with the predetermined surface pressure (of 2 ton/cm²) to form the positive electrode active material layer 6 having a thickness of approximately 100 μm. And the positive electrode 1 was obtained. Preparation methods of a negative electrode, an electrolyte-containing layer and a battery are the same as in Example 1.

Table 5 shows characteristics of the electrode and the battery of Example 6 and those of Example 1. Specifically, there are shown volume specific resistance, changing ratio of resistance and discharging capacitance of each electrode.

TABLE 5

|       | Volume specific resistance ($\Omega \cdot cm$) | Discharging Capacitance (mAh) | Maximum short-circuit current at 140° C. (mA) |
|-------|---------|-----|------|
| Ex. 1 | 100     | 4.3 | 0.1  |
| Ex. 6 | 81      | 4.3 | 0.12 |

As compared with Example 1, both the resistance and the changing ratio of resistance of the electrode in this Example show almost as same as those of Example 1.

Namely, even if an electronically conductive material having a high volume specific resistance is used, volume specific resistance of the electrode in a usual condition can be lowered and discharging capacitance can be improved by adding a conductive agent.

Herein, as the conductive agent, graphite (herein artificial graphite KS-6 (available from LONZA Co., Ltd.)) was used. However, the conductive agent is not limited thereto. The conductive agent may be any material having no PTC function but having a function of improving electrical conductivity of the positive electrode active material layer, for example, carbon black such as acetylene black or lump black.

Also, the positive electrode active material may be a nickel oxide or an active material containing nickel in which a part of metal elements is substituted by nickel.

Additionally, the electrode and the battery shown in the above examples can be used not only for a lithium ion secondary battery of an organic electrolytic solution type, a solid electrolytic type, and a gel electrolytic type, but also for a primary battery such as a lithium/manganese dioxide battery or for another secondary battery.

Furthermore, they are useful for an aqueous-solution primary and secondary battery. They can be further used for a primary and secondary battery of a laminated type, a winding type, a button type and the like without limitation in type of the battery.

Figure 6:
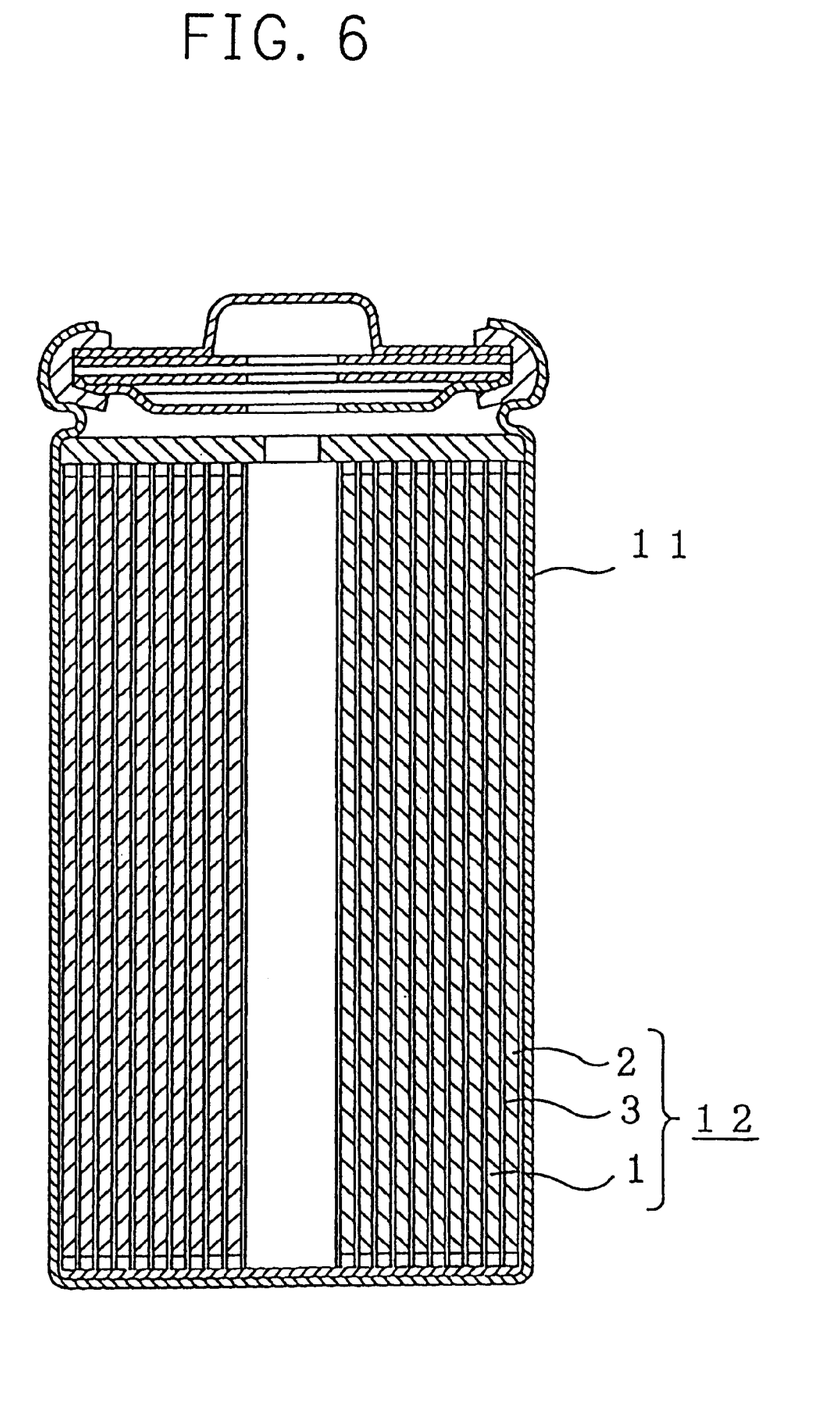
FIG. 6 shows a sectional view of a cylindrical battery.

FIG. 6 is a typical cross sectional view illustrating structure of a cylindrical lithium ion secondary battery. In the figure numeral 11 indicates an outer can made of stainless or the like, which also functions as a negative electrode terminal; numeral 12 indicates a battery body contained inside the outer can 11. The battery body 12 has such a structure that the positive electrode 1, the separator 3 and the negative electrode 2 are spirally wound, and the positive electrode 1 of the battery body 12 has the structure of any electrode described in Examples 1 to 6.

Also, the structure may be such that the negative electrode active material layer of the negative electrode 2 contains the electronically conductive material containing the crystalline resin and the electrically conductive filler.

Industrial Applicability

The battery and the process for preparing the same of the present invention can be applied not only to a lithium ion secondary battery of an organic electrolytic solution type, a solid electrolytic type, and a gel electrolytic type, but also to a primary battery such as a lithium/manganese dioxide battery or another secondary battery.

Furthermore, they can be applied also to an aqueous-solution primary and secondary battery and a primary and secondary battery of laminated type, winding type, button type and the like.

What is claimed is:

1. A battery comprising:

a positive electrode;

a negative electrode; and at least one of a solid electrolytic layer, a gel electrolytic layer and an electrolyte-containing porous layer including fine particles of an electrolyte material, the at least one of the solid electrolytic, gel electrolytic and electrolyte-containing porous layers being positioned between the positive electrode and negative electrode, wherein at least one of the positive electrode and the negative electrode comprises an active material layer containing an active material and an electronically conductive material contacted to the active material, and wherein the electronically conductive material comprises an electrically conductive filler and a resin and increases resistance as temperature rise.

2. A battery according to claim 1, wherein the resin contains a crystalline resin.

3. A battery according to claim 1, wherein the melting point of the resin is in the range of 90° C. to 160° C.

4. A battery according to claim 1, wherein 0.5 to 15 parts by weight of the electronically conductive material is contained based on 100 parts by weight of the active material.

5. A battery according to claim 1, wherein an amount of the electrically conductive filler is 40 to 70 parts by weight in the electronically conductive material.

6. A battery according to claim 1, wherein the electronically conductive material has particle size of 0.05 $\mu$m to 100 $\mu$m.

7. A battery according to claim 1, wherein a carbon material or an electrically conductive non-oxide is used as the electrically conductive filler.

8. A battery according to claim 1, wherein the positive electrode contains a conductive agent.

* * * * *